United States Patent
Wanielik et al.

(10) Patent No.: US 6,414,712 B1
(45) Date of Patent: Jul. 2, 2002

(54) VEHICLE NAVIGATIONAL SYSTEM AND SIGNAL PROCESSING METHOD FOR SAID NAVIGATIONAL SYSTEM

(75) Inventors: Gerd Wanielik; Werner Ritter, both of Ulm (DE)

(73) Assignee: DaimlerChrylsler, AG, Stuttgart (DE)

( * ) Notice: Subject to any disclaimer, the term of this patent is extended or adjusted under 35 U.S.C. 154(b) by 0 days.

(21) Appl. No.: 09/091,186

(22) PCT Filed: Nov. 29, 1996

(86) PCT No.: PCT/EP96/05287

§ 371 (c)(1),
(2), (4) Date: Jun. 10, 1998

(87) PCT Pub. No.: WO97/21982

PCT Pub. Date: Jun. 19, 1997

(30) Foreign Application Priority Data

Dec. 13, 1995 (DE) .......................................... 195 46 506

(51) Int. Cl.⁷ ................................................ H04N 7/18
(52) U.S. Cl. ...................................... 348/118; 348/119
(58) Field of Search ................................. 348/148, 118, 348/119, 121, 122, 159, 162, 163, 164, 169, 170

(56) References Cited

U.S. PATENT DOCUMENTS 5,296,924 A    3/1994  de Saint Blancard
5,801,970 A *  9/1998  Rowland et al. ............. 364/578
5,928,299 A *  7/1999  Sekine et al. .................. 701/42

FOREIGN PATENT DOCUMENTS

| | | |
|---|---|---|
| GB | 2149257 | 6/1985 |
| GB | 2289816 | 11/1995 |
| JP | 5342499 | 12/1993 |
| JP | 07081604 | 3/1995 |
| JP | 07125567 | 5/1995 |

OTHER PUBLICATIONS

R. L.Harvey et al: "Biological Vision Models for Sensor Fusion". In: First conference on control Applications, 1992, vol. 1, pp. 392–397.

E. Young et al: "Improved Obstacle Detection by Sensor Fusion". In: IEE Colloquium on 'Prometheus and Drive', London, UK, 1992, pp. 2/1–2/6.

* cited by examiner

*Primary Examiner*—Andy Rao
(74) *Attorney, Agent, or Firm*—Venable; Norman N. Kunitz; Catherine M. Voorhees

(57) ABSTRACT

The invention relates to a vehicle navigational system with a radar arrangement and an image sensor arrangement. It is proposed to derive target parameters separately from the receiving signals of the two arrangements and to convey them to data merging means to link the separately derived parameters. Linking can be carried out at different levels of digital signal processing.

6 Claims, 1 Drawing Sheet

VEHICLE NAVIGATIONAL SYSTEM AND SIGNAL PROCESSING METHOD FOR SAID NAVIGATIONAL SYSTEM

BACKGROUND OF THE INVENTION

The invention relates to a signal processing method for a vehicle navigational system.

Vehicle navigational systems using various techniques and examples for application are mentioned, for example, in the publication"Kraftfahrzeugtechnik" 1993, Section Technology-Dictionary. A controlled communication for convoys for use with motor-vehicle navigational systems is described in the publication "Automobiltechnische Zeitschrift" 90 (1988), pages 429–436.

A vehicle navigational system with a sensor fusion of radar sensor and video camera is known from a publication by E. Young et al. In IEE Colloquium on"Prometheus and Drive" (Digest No. 172), London, UK, 10.15.92. The radar sensor and video camera measurements are carried out independent of each other, and a common set of measurements and their probability distributions are subsequently created through data merging.

When using an image sensor arrangement, e.g. a video camera, with automatic image evaluation for detecting and classifying form, color, direction, aspect angle, etc. of interesting objects and the complexity of the observed scenery, the processing expenditure in an associated image evaluation system is very high.

SUMMARY OF THE INVENTION

It is the object of the present invention to specify a signal processing method for a vehicle navigational system, which supplies reliable environmental information with high efficiency.

This is achieved by a signal processing method for a vehicle navigational system having a radar arrangement and an image sensor arrangement which essentially monitor equal solid-angle regions, for which target parameters are respectively determined from the signals received from the radar arrangement and the image sensor arrangement, and wherein the determined target parameters from corresponding solid angle regions are linked through data merging, the method including the steps of creating reduced data sets and the resultant derived target parameters during the evaluation of the signals received from the radar and image sensor arrangements through a suitable linking of the data; specifying solid angle sections for the image evaluation during the evaluation of the signals received from the radar arrangements; and evaluating the signals received from the image sensor arrangement solely from these specified solid angle sections.

Advantageous embodiments and modifications of the invention will be described in the following description.

BRIEF DESCRIPTION OF THE DRAWINGS

The foregoing and other objects features and advantages will be more readily understood upon reading the following detailed description of the drawings in which.

DETAILED DESCRIPTION OF THE INVENTION

Figure 1:
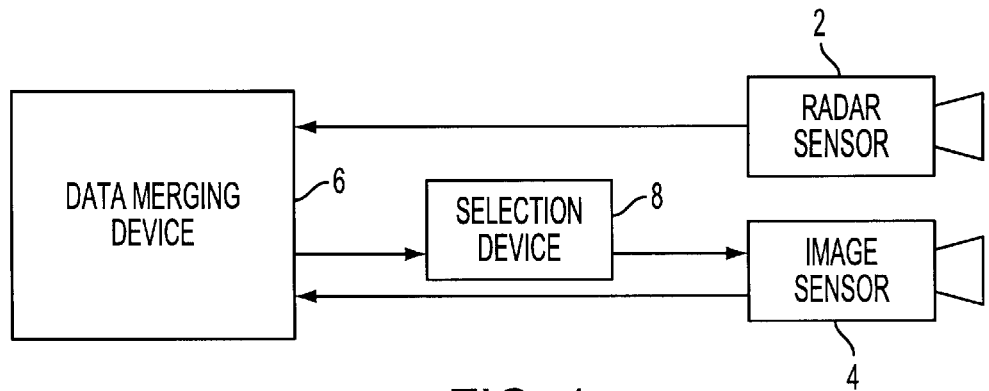
FIG. 1 is a schematic diagram of the vehicle navigational system employed with the signal processing method according to the invention.

As shown in FIG. 1 the vehicle navigational system comprises a radar arrangement 2 with associated radar evaluation devices, which derive first target parameters from the incoming radar signals and, an image sensor arrangement 4 with associated image evaluation devices, which derive second target parameters from the signals received from the image sensor. Additional sensor arrangements can be added.

The radar arrangement 2 and the image sensor arrangement 4 monitor a joint solid angle region. The radar arrangement 2 here shows a first solid angle resolution of, for example, 8–32 angular increments at respectively $\geq 0.75$ degrees azimuth and 1–8 angular increments for respectively $\geq 3$ degrees elevation. The same angle region is imaged on the image sensor arrangement 4 with a second, normally higher solid-angle resolution on an image point array of 512×512 pixels. Thus, a plurality of image pixels of the image sensor arrangement must respectively be associated geometrically with each solid-angle grid element in the radar arrangement. The further processing of target parameters in a data merging device 6 preferably occurs in the solid-angle resolution of the image sensor arrangement, wherein for a pixel by pixel joining of the parameter values, the values from a radar grid element are respectively transferred to all associated pixels. In case a changeover becomes necessary during one stage of the signal processing from the high second solid-angle resolution of the image sensor arrangement to a lower solid-angle resolution, the values of pixels which must then be combined can preferably be converted to new values with the aid of statistical methods for averaging, forming a median line etc. For the geometric association of various solid-angle resolutions, a pre-processing may be necessary, such as the compensation for image distortions and parallel axis errors, elevation corrections, grid compensation, etc.

Arrangements that are known per se can be used for the radar arrangement and the image sensor arrangement. The solid-angle resolution can be achieved with a radar arrangement in the known way by turning a directive pattern or by means of a sensor array with a fixed diagram fan or intermediate forms. Preferred is an arrangement with a sensor array and a focusing device, such as a reflector or lens. Such radar arrangements are also called imaging radar arrangements. A camera, possibly in connection with lighting devices, particularly infrared laser lighting, can be used for the image sensor arrangement.

Figure 2:
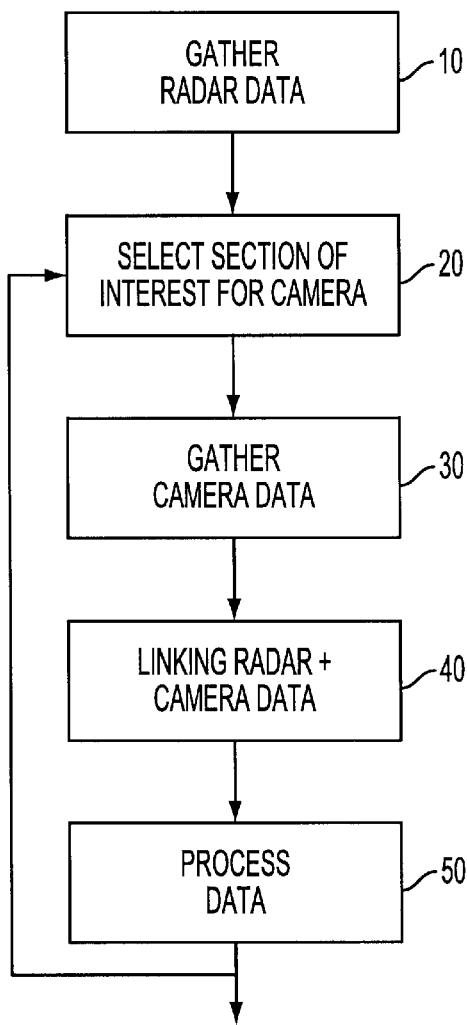
FIG. 2 is a flow chart of operation of the signal processing method according to the invention.

The incoming signals and data derived thereof in the various evaluation stages are preferably processed digitally by using one or several processors as described below referring to the flow chart of FIG. 2.

The target parameters derived from the incoming signals can be linked at different points of the evaluation process, wherein the tasks coming up for evaluation are distributed differently to the radar evaluation devices (step 10) on the one hand and the image evaluation devices on the other hand (step 30), depending on the selected variant.

A first advantageous embodiment provides that the data are linked in the evaluation devices on a low processing level with only a low evaluation effort, in that the radar evaluation devices, for example, determine from the incoming radar signals the relative speed and distance in the solid-angle resolution provided for the radar arrangement. If necessary, further values such as the depolarization degree etc. of detected targets, the pixel brightness and possibly the color on the image evaluation devices as target parameters can be determined. Value, and that the values determined in this way are combined as angular segments in the data merging device in the solid angle resolution provided for the further processing, e.g. as parameter vector with the components relative speed, distance, brightness, color. These parameter vectors function as linked base data for a further processing, which already includes in particular a target classification, for example by differentiating between the classes such as obstacle, preceding vehicle, roadway edge, traffic signals and the like. Further measures can subsequently be derived in the standard way from the target classes, determined during the classification. As a result of linking the parameters from the separate evaluation devices in step 40, a set of data is available for the classification (or any other evaluation method step 50), which is more encompassing and more precise owing to the fact that the different arrangements are specifically geared to the individual parameters, which data set permits a reliable classification. In accordance with one advantageous modification, the further processing of parameters from the image evaluation device can be limited in the data merging device 6 to the solid angle sections in which target echo signals are detected by the radar arrangement via section selection device 8 in Step 20. As a rule, the expenditure for processing the incoming signals from the image sensor arrangement can be reduced considerably with this. The areas immediately surrounding such solid-angle sections can also be taken into account. This makes it possible to take into account the fact that regions reflecting the radar signals and regions providing a lot of data for the object image analysis frequently do not coincide exactly, e.g. white lines on the roadway surface appear as clear optical signals and the further removed edge of the road surface is detected as the edge in the radar arrangement.

In accordance with another advantageous embodiment, the measured variables from the incoming signals of the various arrangements are already linked to objects in the separate evaluation devices, for which proximity comparisons on the approximate equality of adjacent measuring variables and connected regions are preferably made. The separate evaluation devices will then preferably transmit reduced data sets as parameters for the objects, e.g. gravity center, average relative speed, concerned solid-angle section etc., to the data merging device, which then links the object parameters direction-selectively. The result of this linking can be that an object determined by one set of evaluation devices, e.g. the radar evaluation devices, must be associated either with no objects or with several objects of the other set of evaluation devices, e.g. the image evaluation devices. The object definition for this embodiment can also be limited to specific solid-angle sections in the more computer-bound image evaluation devices, based on target discoveries in the radar evaluation devices.

A further advantageous embodiment provides that a pre-classification of targets is carried out in the separate evaluation devices, based solely on the incoming signals from the respectively associated arrangement, and that the results of this pre-classification are again linked direction-selective in the data merging device. The pre-classification results preferably are weighted with a quality rating during this linking to a final class association, which reflects a credibility of the estimation made in various classes. As a result of this, it is possible, for example, to take into account that a specific target class can be detected with considerably more reliability with the radar arrangement than with the image sensor arrangement. For example, the probabilities determined for the various classes during the pre-classification can be multiplied for this during the linking with arrangement and class specific, predetermined factors. In accordance with another variant, the pre-classification results of the respective evaluation device can be preferred as to their credibility, based on the statistical distribution of the probabilities, e.g. in such a way that with a nearly equal distribution of the probabilities for the various target classes, a low credibility on the whole is assumed for the linking of the pre-classifications, for example in the form of a low multiplicative factor. A high credibility, e.g. in the form of a high factor, would then be assumed if the distribution is very unequal. The aforementioned variants for evaluating the credibility of the pre-classifications can also be used in combination.

The evaluation devices and data merging devices mentioned in the above examples must not necessarily be separate units, but can also be realized in a sufficiently powerful, digital signal processing unit in the form of sub-units or programmed control commands.

It is particularly advantageous if the invention is used as navigational system in the area of traffic control technology and for guidance systems on airport runways. In the latter case, service vehicles as well as aircraft moving on the runway can be equipped with such a navigational system.

What is claimed is:

1. A signal processing method for a vehicle navigational system having a radar arrangement and an image sensor arrangement, the method including the steps of:
    monitoring a solid-angle region with the radar arrangement;
    monitoring essentially the same solid-angle region with the image sensor arrangement;
    determining respective target parameters from the signals received from the radar arrangement and the image sensor arrangement;
    linking the target parameters determined from signals received from the radar arrangement with the target parameters determined from signals received from the image sensor arrangement through data merging wherein reduced data sets and the resultant derived target parameters are created during the evaluation of the signals received from the radar and image sensor arrangements through a suitable linking of the data;
    specifying solid angle sections for an image evaluation based on the evaluation of the signals received from the radar arrangement; and
    evaluating the signals received from the image sensor arrangement solely from these specified solid angle sections.

2. A signal processing method according to claim 1, wherein a target classification is carried out during the data merging.

3. A signal processing method according to claim 1 wherein a separate target pre-classification is respectively carried out during the evaluation of the incoming signals in the radar and image sensor arrangement and that the various target pre-classifications are linked during the data merging.

4. A signal processing method according to claim 3, wherein the target pre-classification results are weighted with a quality rating during the data merging.

5. A signal processing method according to claim 1, respectively separate target parameters are derived during the radar and image evaluation of the incoming signals and that the separately derived target parameters are combined in a joint parameter vector during the data merging.

6. A signal processing method according to claim 1, wherein solid-angle sections with target reports are specified for the radar evaluation of the incoming signals and that for the image evaluation, only the signals received from the image sensor arrangement for these solid-angle sections are evaluated.

* * * * *